March 2, 1926.                    J. K. SMITH                    1,575,454
                                    SWITCH
                              Filed August 5, 1924
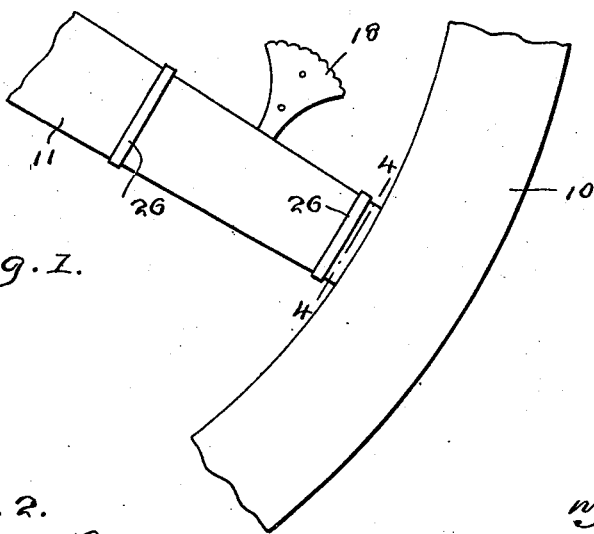
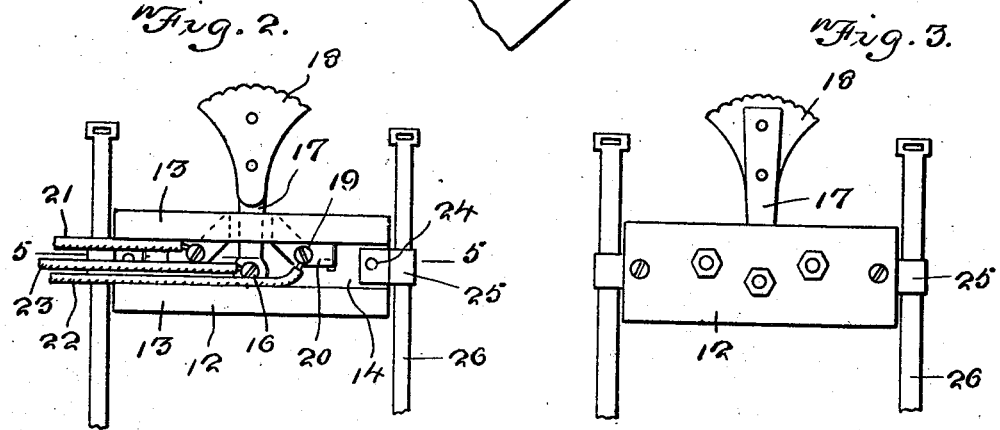
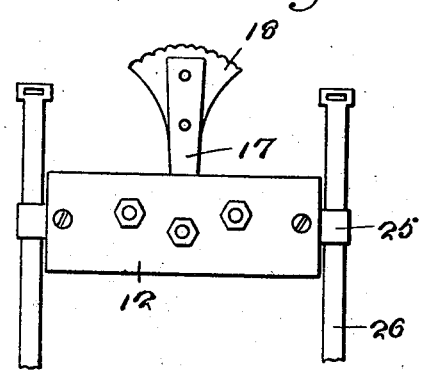
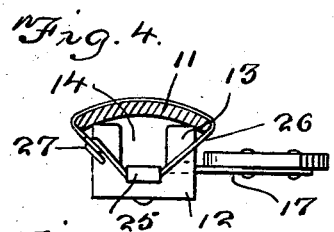
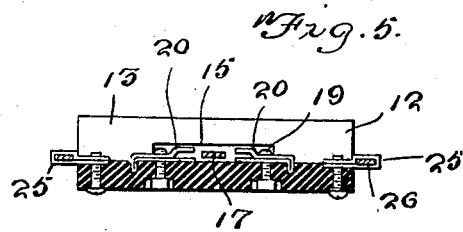
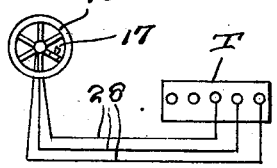
J. K. Smith
INVENTOR
BY Victor J. Evans
ATTORNEY
WITNESS:

Patented Mar. 2, 1926.

1,575,454

UNITED STATES PATENT OFFICE.

JULIAN K. SMITH, OF CLEVELAND, OHIO.

SWITCH.

Application filed August 5, 1924. Serial No. 730,269.

*To all whom it may concern:*

Be it known that I, JULIAN K. SMITH, a citizen of the United States, residing at Cleveland, in the county of Cuyahoga and State of Ohio, have invented new and useful Improvements in Switches; of which the following is a specification.

This invention relates to electric switches and has for an object the provision of a switch which is capable of being secured to the steering wheel of an automobile for controlling the headlights of the latter, whereby the said lights may be changed from bright to dim and vice versa without removing the hands from the wheel or without removing the eyes from the roadway.

Another object of the invention is the provision of a switch which is simple and efficient in construction and operation and which may be readily attached to the steering wheel whereby the latter will form a cover for the switch.

With the above and other objects in view, the invention further includes the following novel features and details of construction, to be hereinafter more fully described, illustrated in the accompanying drawings and pointed out in the appended claims.

In the drawings:—

Figure 1 is a fragmentary top plan view showing a portion of an automobile steering wheel with the invention applied.

Figure 2 is a top plan view of the switch removed from the wheel.

Figure 3 is a bottom plan view of the switch.

Figure 4 is a sectional view on the line 4—4 of Figure 1.

Figure 5 is a section on the line 5—5 of Figure 2.

Figure 6 is a diagrammatic view illustrating the manner of connecting the switch with the terminal block of a Ford automobile.

Referring to the drawings in detail wherein like characters of reference denote corresponding parts, the reference character 10 indicates the rim or hand grip portion of an automobile steering wheel, a portion of one of the arms or spokes being indicated at 11.

The switch which is designed for attachment to the steering wheel comprises a base block 12 which is formed of suitable insulating material and which is provided with spaced ribs 13. These ribs extend longitudinally along opposite edges of the block 12 and provide a channel 14 within which is mounted the various switch elements. One of the ribs 13 is provided with a longitudinally extending slot 15 and extending through this slot and pivotally secured within the channel 14 as shown at 16 is one end of a switch lever 17. The outer end of the lever 17 has secured thereto an insulated finger piece 18.

Secured within the channel 14 as indicated at 19 are spaced contacts 20. These contacts are located upon opposite sides of the switch arm 17 and extend within the slot 15 in the path of the switch arm so that the latter may be moved pivotally to engage either of the contacts or may be positioned centrally therebetween. The securing means 16 and 19 of the switch arm and contacts also provide terminals for conductor wires 21, 22 and 23. The wire 21 may lead to the bright lights, the wire 22 to the dim lights and the wire 23 to the battery of the automobile. Thus, movement of the switch arm in one direction will light the bright lights while movement in an opposite direction will light the dim lights.

Secured within opposite ends of the channel 14 as shown at 24 are loops 25. These loops extend outward and receive attaching strips 26 which are adapted to be secured around the spokes 11 are shown in Figures 1 and 4 of the drawings and to have their opposite ends connected as indicated at 27. By reference to Figure 4 of the drawings it will be seen that this manner of attaching the switch to the arm 11 is such that the said arm bridges over the channel and forms a closure or cover for the switch, while the switch arm 17 is arranged so that it may be conveniently operated by the driver without removing his hand from the steering wheel.

In Figure 6 of the drawings the invention is shown as connected to the terminal block T ordinarily used in Ford automobiles. In this figure the reference character 10′ indicates the steering wheel, the switch arm 17 extending from beneath one of the spokes thereof. The contacts 20 and the switch arm 17 have connected thereto conductor wires 28 which lead to the three outside terminals of the terminal block, the latter being connected to the headlights and battery in the usual manner.

The invention is susceptible of various changes in its form, proportions and minor details of construction and the right is herein reserved to make such changes as properly fall within the scope of the appended claims.

Having described the invention what is claimed is:—

1. The combination with an automobile steering wheel, of an electric switch comprising a base block formed of insulating material and provided with spaced parallel ribs defining a central channel, one of said ribs having a longitudinally disposed slot therein, a switch arm extending through the slot and having its inner end pivotally secured within the channel, spaced contacts secured within the channel upon opposite sides and in the path of the arm and means for securing the switch to the steering wheel whereby the latter will bridge the space between the ribs and provide a cover for the channel.

2. The combination with an automobile steering wheel, of an electric switch comprising a base block formed of insulating material and provided with spaced parallel ribs defining a central channel, one of said ribs having a longitudinally disposed slot therein, a switch arm extending through the slot and having its inner end pivotally secured within the channel, spaced contacts secured within the channel upon opposite sides and in the path of the arm and loops secured within and extending from opposite ends of the channel and attaching strips extending through the loops transversely of the channel for engagement around a spoke of the steering wheel, whereby the spoke will bridge the space between the ribs and provide a cover for the channel.

JULIAN K. SMITH.